P. W. ANDERSON & J. T. KENNELLY.
TIRE ARMOR.
APPLICATION FILED APR. 19, 1915.
1,192,149.
Patented July 25, 1916.
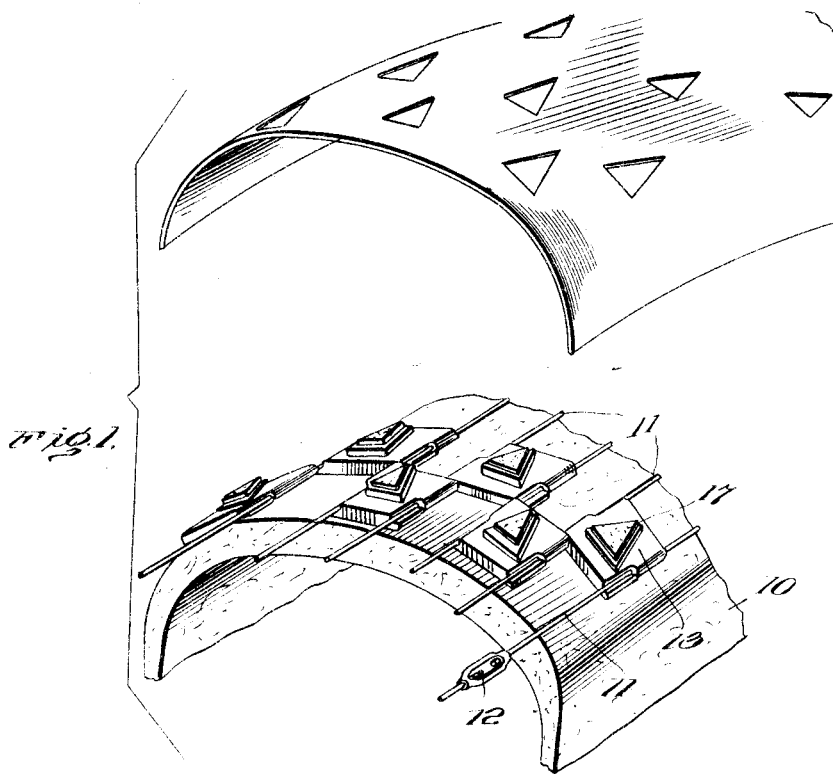
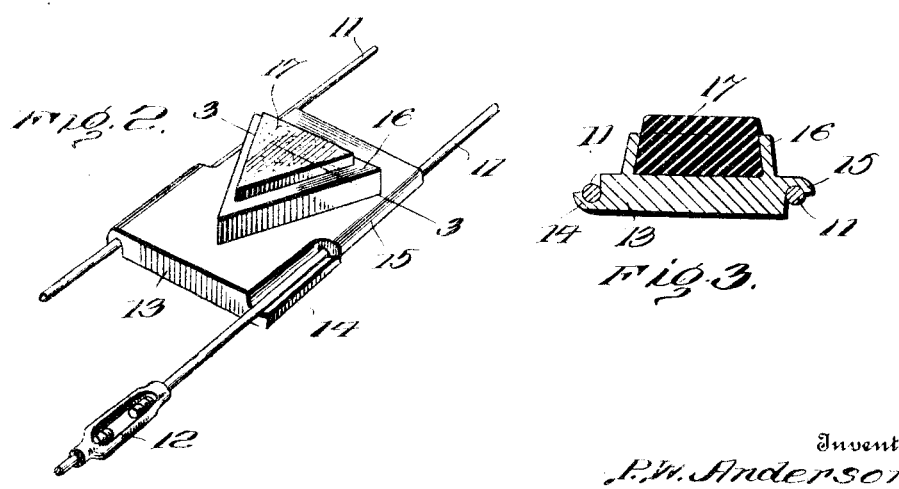
Inventors
P. W. Anderson
J. T. Kennelly
By
Attorneys

UNITED STATES PATENT OFFICE.

PETER W. ANDERSON AND JOSEPH T. KENNELLY, OF RAWLINS, WYOMING.

TIRE-ARMOR.

1,192,149. Specification of Letters Patent. Patented July 25, 1916.

Original application filed October 14, 1914, Serial No. 866,664. Divided and this application filed April 19, 1915. Serial No. 22,423.

*To all whom it may concern:*

Be it known that we, PETER W. ANDERSON and JOSEPH T. KENNELLY, citizens of the United States, residing at Rawlins, in the county of Carbon and State of Wyoming, have invented certain new and useful Improvements in Tire-Armors, of which the following is a specification.

This invention contemplates an improved armor for vehicle tires being particularly adapted for use in connection with the pneumatic tires of motor vehicles and constitutes a division of our pending application filed Oct. 14, 1914, Serial No. 866,664.

The invention has as its primary object to provide an armor which may be readily applied to the tire and which, in use, will be adapted to effectively protect the tire.

A further object of the invention is to provide an armor which will also at the same time be adapted to prevent skidding of the tire or wheel to which the armor is applied.

The invention has as a further object, in this connection, to provide an armor having a plurality of knobs adapted to engage the ground or road surface, to thus prevent the slipping of the tire to which the armor is applied. And the invention has as a still further object to provide an armor which will be comparatively simple in construction and which may be applied to almost any conventional type of tire without the necessity of structural change therein.

Other and incidental objects will appear as the description proceeds and in the drawings wherein we have illustrated the preferred embodiment of the invention and wherein similar reference characters designate corresponding parts throughout the several views, Figure 1 is a fragmentary perspective view showing the manner in which our improved armor is applied to a tire, Fig. 2 is a perspective view showing one of the armor plates detached as well as the manner in which the said plate is supported in operative position, and Fig. 3 is a transverse sectional view taken on the line 3—3 of Fig. 2 and particularly showing the mounting of the anti-skidding knobs carried by the armor plates.

Referring more particularly to the drawings, we have for convenience, in Fig. 1, conventionally shown a portion of a tire at 10. It will be understood that our improved armor is especially adapted for use in connection with pneumatic tires although it may be applied to tires of other types.

In carrying out our invention, we employ a plurality of annular bands or wires 11, the said bands being preferably formed from suitable resilient metal and each having its extremities detachably connected in any suitable manner as by a turn buckle 12. The bands 11 are adapted to completely encircle the tire 10 to seat against the outer face thereof as shown in Fig. 1 of the drawings, and mounted upon the said bands, are a plurality of armor sections or plates 13. The plates 13 are substantially rectangular in contour and are each preferably formed from a piece of suitable resilient sheet metal. Formed on opposite sides of each of said plates are opposed flanges 14 and 15, the flanges upon one side of each of said plates being reversely arranged to the flanges upon the other side thereof. It will be observed upon reference to Fig. 2 of the drawings, that the side margins of each of said plates are cut away to provide the flanges 14 which, as will be noted, are substantially semi-circular in cross-section, while portions of the side margins of each of said plates upon the side thereof opposite to the cut away portions providing the flanges 14, are similarly cut away to provide the flanges 15, also substantially semi-circular in cross-section.

The flanges 14 and 15 of the plates 13, preferably extend throughout the entire length of the said plates and are adapted to freely receive the bands 11, the plates being mounted between adjacent bands and arranged in staggered relation as best shown in Fig. 1 of the drawings with the said bands threaded over the flanges 14 and beneath the flanges 15.

Formed upon one side of each of the plates 13 is an upstanding substantially triangular socket 16, which is provided with an inner beveled wall and is adapted to receive the larger end of a yieldable knob 17 in the manner best shown in Fig. 3 of the drawings. The knobs 17 are preferably formed of rubber although any other suitable material may be employed and in initially mounting the said knobs within the sockets, it will, of course, be understood that the larger ends thereof are compressed and are then inserted within the sockets 16 to expand within the larger inner extremities of the said sockets and engage against the inner walls thereof for thus securely connecting the knobs with the sockets. It will thus be observed that when the armor is mounted upon the tire 10 in the manner shown in Fig. 1 of the drawings, the knobs 17 will project radially of the tire to provide anti-skidding devices tending to prevent the slipping of the tire in use, and to efficiently protect the tread of the tire, we employ in connection with the several bands 11, an annular metallic band 18, adapted to encircle the tire 10 and fit over the said bands with the sockets 16 projecting through the band 18. As shown in Fig. 1 of the drawings, the band 18 is provided with suitable openings which are arranged to receive the sockets 16 and is of such cross-sectional contour, as to substantially conform to the contour of the tire 10. As will be clear, the band 18 will, in use, reduce to a minimum the possibility of puncturing the tire 10 and is adapted to come into direct contact with the road surface to thus take up the wear which would otherwise come directly upon the tire.

It will therefore be seen that we provide an exceptionally efficient construction for the purpose set forth since the improved armor may be applied to almost any conventional type of tire without the necessity of structural change therein. As will be understood, a load upon the tire 10 will have a tendency to compress the knobs 17 within the sockets 16 so that the outer edges of the said sockets will contact with the surface over which the tire is passing to thus engage the roadway and render it unnecessary, in wet weather, to use chains such as are now commonly employed. In this connection, it may be stated that although the band 18 is preferably formed of resilient sheet metal, still, any other suitable material may be employed such as will, in use, be found entirely practicable.

Having thus described our invention, what we claim and desire to secure by Letters Patent is:—

A device of the character described including a plurality of annular members, a plurality of plates freely mounted thereon and supported between adjacent members in staggered relation with the ends of the plates abutting each other for holding the plates in proper spaced relation circumferentially of the said members, radial knobs carried by said plates, and a band adapted to encircle the said members to fit over the said plates with the knobs projected through the band.

In testimony whereof we affix our signatures in presence of two witnesses.

PETER W. ANDERSON. [L. S.]
JOSEPH T. KENNELLY. [L. S.]

Witnesses:
G. H. MERRELL,
C. H. ANDERSON.